(12) United States Patent
Contreras et al.

(10) Patent No.: US 12,183,372 B2
(45) Date of Patent: Dec. 31, 2024

(54) SYSTEM CONTROLLED RF SIGNAL SOURCE ARCHITECTURE WITH TRANSDUCER NEAR POLE-TIP FOR MICROWAVE ASSISTED MAGNETIC RECORDING

(71) Applicant: Western Digital Technologies, Inc., San Jose, CA (US)

(72) Inventors: John T. Contreras, Palo Alto, CA (US); Howard Gordon Zolla, Los Gatos, CA (US); Yunfei Ding, Fremont, CA (US); Joey M. Poss, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/447,419

(22) Filed: Aug. 10, 2023

(65) Prior Publication Data

US 2024/0203449 A1    Jun. 20, 2024

Related U.S. Application Data

(60) Provisional application No. 63/433,808, filed on Dec. 20, 2022.

(51) Int. Cl.
*G11B 5/60* (2006.01)
*G11B 5/012* (2006.01)
*G11B 5/00* (2006.01)

(52) U.S. Cl.
CPC ........ *G11B 5/012* (2013.01); *G11B 2005/001* (2013.01)

(58) Field of Classification Search
CPC ....... G11B 5/3929; G11B 5/012; G11B 5/314; G11B 5/3912; G11B 2005/0021; G11B 27/36; G11B 5/6011
USPC .................................................. 360/59, 234.4
See application file for complete search history.

(56) References Cited

U.S. PATENT DOCUMENTS

| | | |
|---|---|---|
| 8,582,240 B1 | 11/2013 | Chen et al. |
| 10,424,323 B1 | 9/2019 | Contreras et al. |
| 11,056,134 B1 | 7/2021 | Eppler |
| 11,087,784 B2 * | 8/2021 | Contreras ............ G11B 5/3912 |
| 2009/0262457 A1 | 10/2009 | Rivkin et al. |
| 2011/0149428 A1 | 6/2011 | Franca-Neto et al. |
| 2013/0258527 A1 | 10/2013 | Soeno et al. |
| 2016/0064015 A1 | 3/2016 | Rivkin et al. |
| 2021/0327462 A1 | 10/2021 | Contreras et al. |

FOREIGN PATENT DOCUMENTS

CN    101465155 A    6/2009

* cited by examiner

*Primary Examiner* — Nabil Z Hindi
(74) *Attorney, Agent, or Firm* — Neugeboren O'Dowd PC

(57) ABSTRACT

Various illustrative aspects are directed to a data storage device comprising a disk and a read/write head configured to read data from and write data to the disk. The read/write head comprises a write pole tip and a transducer configured near the write pole tip. One or more processing devices are mounted on or near the read/write head and generate an AC current that is applied to the transducer to cause the transducer to generate a high frequency auxiliary field that is applied to the disk. The one or more processing devices may be an RF source IC mounted on or near a slider on which the read/write head is integrated or mounted.

19 Claims, 9 Drawing Sheets

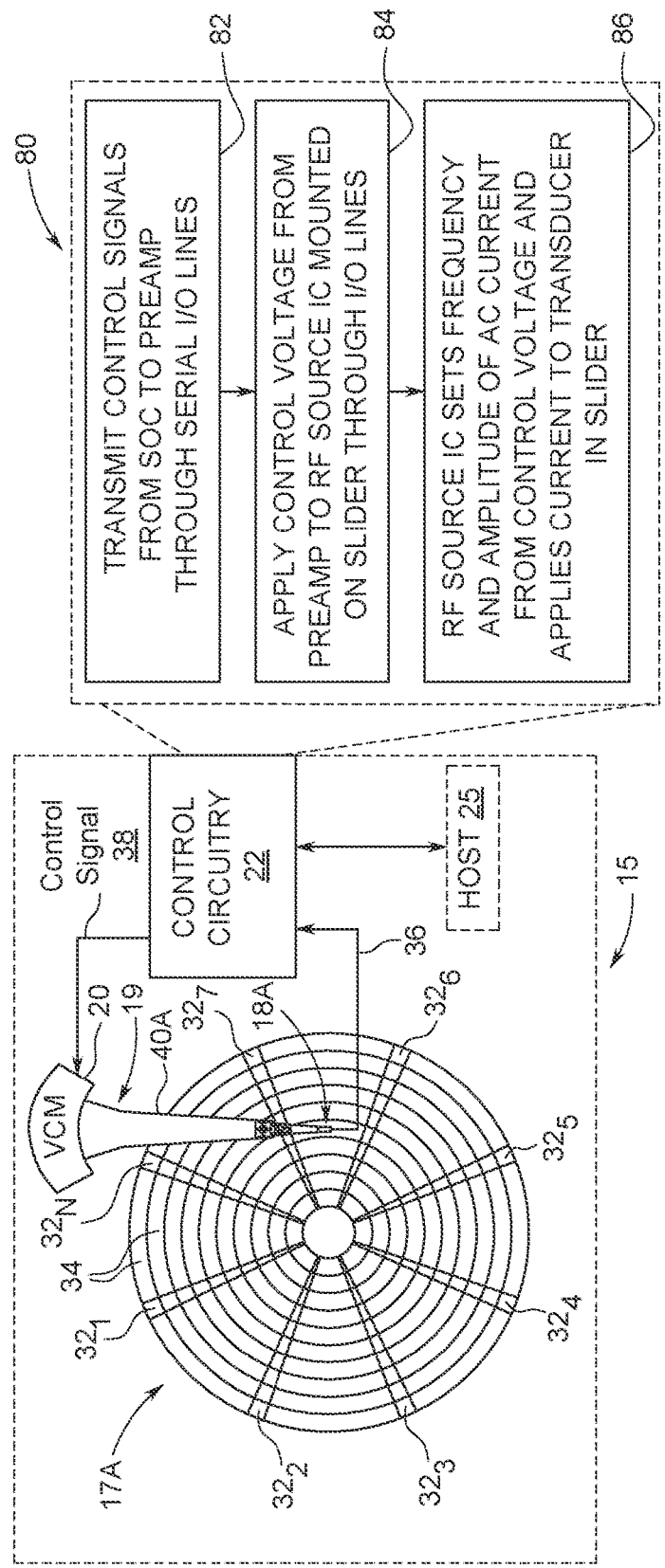
FIG. 2A
FIG. 2C
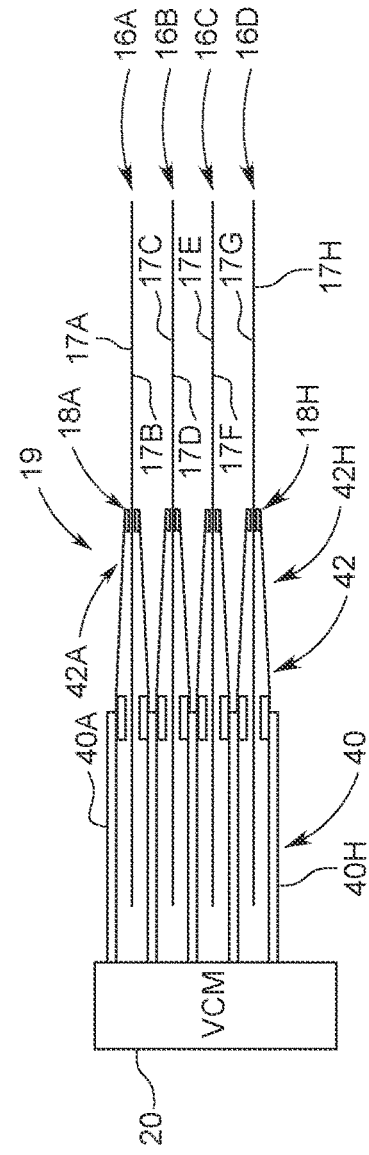
FIG. 2B

SYSTEM CONTROLLED RF SIGNAL SOURCE ARCHITECTURE WITH TRANSDUCER NEAR POLE-TIP FOR MICROWAVE ASSISTED MAGNETIC RECORDING

CLAIM OF PRIORITY UNDER 35 U.S.C. § 120

The present application for patent claims priority to Provisional Application No. 63/433,808 entitled "SYSTEM CONTROLLED RF SIGNAL SOURCE ARCHITECTURE WITH TRANSDUCER NEAR POLE-TIP FOR MICROWAVE ASSISTED MAGNETIC RECORDING" filed Dec. 20, 2022, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially spaced, concentric servo tracks 4 defined by servo wedges $6_0$-$6_N$ recorded around the circumference of each servo track. A plurality of concentric data tracks is defined relative to servo tracks 4, wherein the data tracks may have the same or a different radial density (e.g., tracks per inch (TPI)) relative to servo tracks 6. Each servo wedge 6, comprises a preamble 8 for storing a periodic pattern, which allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Since data on an HDD is written on tracks, higher tracks per inch (TPI) and higher bits per inch (BPI) on those tracks result in higher areal density, which enables more data per disk. Energy assisted magnetic recording (EAMR), which involves focusing energy on the track being written to make the disk media easier to write to, is one approach for increasing aerial density. One type of EAMR is microwave assisted magnetic recording (MAMR), which typically uses a spin torque oscillator (STO) to apply a high frequency auxiliary magnetic field to the media close to the resonant frequency of the magnetic grains of the disk media, thereby enabling the magnetic field generated by the write coil to switch the orientation of the grains more readily. The STO is typically integrated directly into the head assembly near the pole-tip, and a DC bias current is applied to the STO to generate the magnetic field that is applied to the media.

According to aspects of the present disclosure, an extrinsic RF signal source—rather than an STO—is used to set the frequency and amplitude of an AC current that is applied to a transducer in the head, which in turn generates the high frequency auxiliary field that is applied to the media to provide, for example, the resonance effect in the media grains according to the principles of MAMR. The inventors have found that write performance is proportionally improved in correlation with the power and frequency of the extrinsic RF signal (AC current). An RF source IC that is external to the recording head structure (e.g., placed on or near the slider) generates and applies the AC current to a transducer that is placed within the head assembly (e.g., near the pole-tip and air-bearing surface of the slider/head).

Various illustrative aspects are directed to a data storage device comprising a disk and a read/write head configured to read data from and write data to the disk. The read/write head comprises a write pole tip and a transducer configured near the write pole tip. One or more processing devices comprising an RF source IC is configured to generate an AC current that is applied to the transducer to cause the transducer to generate a high frequency auxiliary field that is applied to the disk.

In some implementations, the data storage device further comprises a slider on which the read/write head is integrated or mounted, and the RF source IC is mounted on or near the slider.

In some implementations, the data storage device further comprises a preamplifier that is connected to the RF source IC through first a first I/O line and a second I/O line. The preamplifier is configured to transmit a control voltage over the first I/O line and a ground signal over the second I/O line to the RF source IC, and the RF source IC is configured to set an amplitude and a frequency of the AC current that is applied to the transducer in response to the control voltage and ground signal received from the preamplifier.

In some implementations of the data storage device, the preamplifier is connected to the RF source IC through a third I/O line, and the preamplifier is configured to transmit a frequency range control signal to the RF source IC over the third I/O line.

In some implementations, the data storage device further comprises a system-on-a-chip (SoC) that is coupled to the preamplifier. The SoC is configured to transmit a control signal to the preamplifier that causes the preamplifier to generate and output the control voltage to the RF source IC.

In some implementations of the data storage device, the RF source IC comprises a ring oscillator that is configured to control the frequency of the AC current that is applied to the transducer.

In some implementations of the data storage device, the RF source IC further comprises an operational transconductance amplifier (OTA) that is configured to drive the strength and to change the frequency range of the ring oscillator. The OTA may be configured to be driven by a bandgap reference voltage and the control voltage.

In some implementations of the data storage device, the RF source IC further comprises a bandgap reference circuit that is configured to be driven by the control voltage and that is configured to generate and supply the bandgap reference voltage to the OTA. The bandgap reference voltage generated by the bandgap reference circuit may be approximately 1.2 volts.

In some implementations of the data storage device, the RF source IC further comprises a low drop-out regulator configured to generate a reference voltage.

Various illustrative aspects are also directed to a method of operating a data storage device. The method comprises transmitting a control signal from a system-on-a-chip (SoC) to a preamplifier; in response to the control signal, generating and transmitting a control voltage from the preamplifier to an RF source IC mounted on or near a slider; and, in response to the control voltage, setting a frequency and an amplitude of an AC current by the RF source IC, and applying the AC current to a transducer that is configured in the slider near the write pole tip of a read/write head, such that the transducer generates a high frequency auxiliary field that is applied to a disk of the data storage device. Additional disclosure of the related recording head designs and methods of recording is provided in commonly owned U.S. application Ser. No. 17/183,161 titled "Magnetic Recording Devices Having External Alternating Current Sources" filed on Feb. 23, 2021, the disclosure of which is hereby incorporated by reference.

In some implementations, the method further comprises transmitting the control voltage from the preamplifier to the RF source IC through a first I/O line; and transmitting a ground signal from the preamplifier to the RF source IC through a second I/O line. In some implementations, the method may further comprise transmitting a frequency range control signal from the preamplifier to the RF source IC through a third I/O line.

In some implementations, the method further comprises transmitting the control signal from the SoC to the preamplifier through a serial I/O line.

In some implementations, the method further comprises setting the frequency of the AC current by a ring oscillator in the RF source IC. In some implementations, an operational transconductance amplifier (OTA) drives the strength and changes the frequency of the ring oscillator. In some implementations, the OTA is driven by a bandgap reference voltage and the control voltage.

Various illustrative aspects are further directed to one or more processing devices comprising: means for transmitting a control signal from a system-on-a-chip (SoC) to a preamplifier; means for, in response to the control signal, generating and transmitting a control voltage from the preamplifier to an RF source IC mounted on or near a slider; and means for, in response to the control voltage, setting a frequency and an amplitude of an AC current by the RF source IC and applying the AC current to a transducer that is configured in the slider near a write pole tip of a read/write head, such that the transducer generates a high frequency auxiliary field that is applied to a disk of the data storage device.

In some implementations, the one or more processing devices further comprise means for transmitting the control voltage from the preamplifier to the RF source IC through a first I/O line; and means for transmitting a ground signal from the preamplifier to the RF source IC through a second I/O line.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, according to various aspects of the present disclosure.

FIG. 2C illustrates a method that a data storage device may perform, execute, and implement, according to various aspects of the present disclosure.

DETAILED DESCRIPTION

Figure 1:
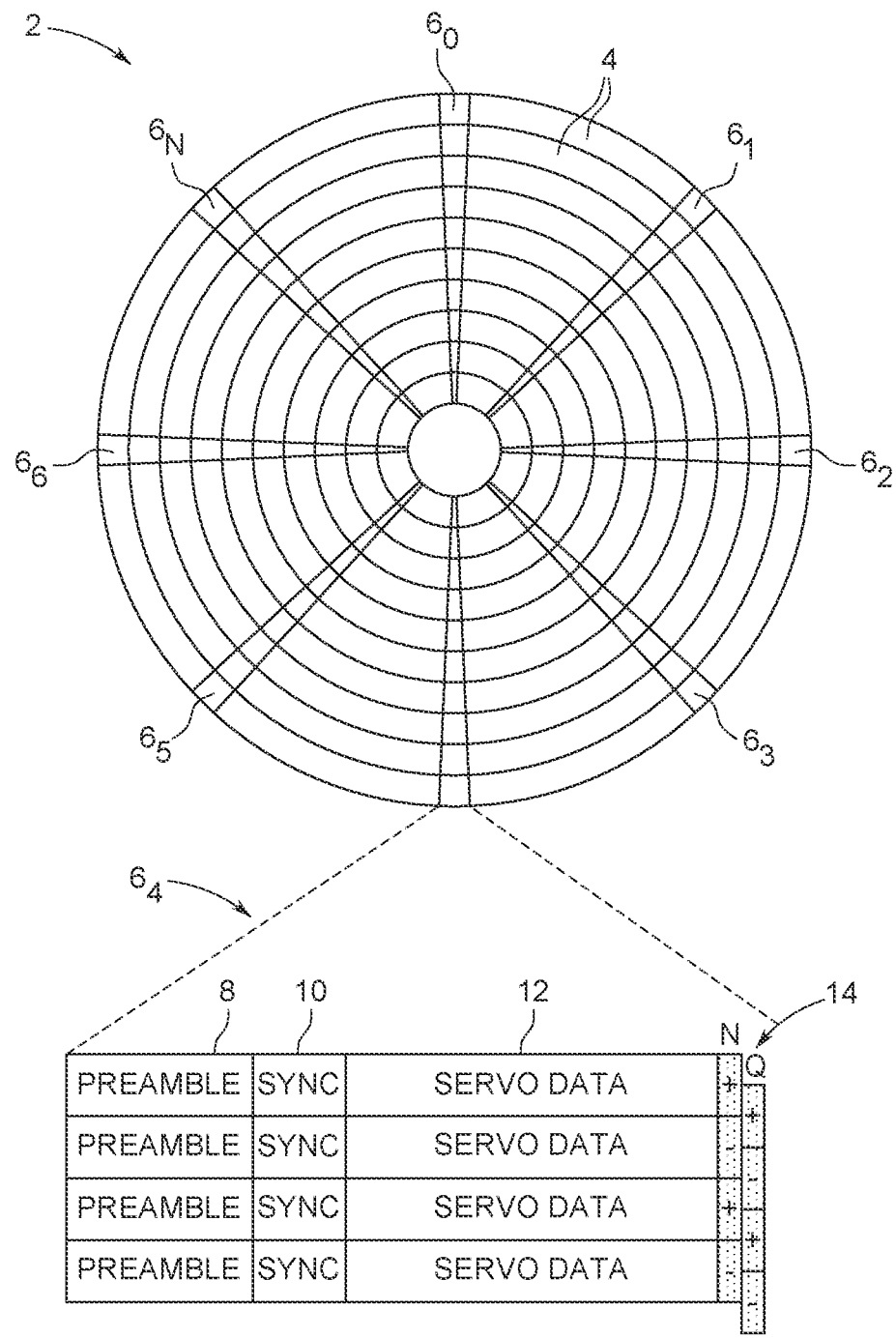
FIG. 1 shows a disk format as comprising a number of radially-spaced, concentric servo tracks defined by servo wedges recorded around the circumference of each servo track, according to various aspects of the present disclosure.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiments are presented to provide a description so that others skilled in the art may utilize their teachings. Technology continues to develop, and elements of the described and disclosed embodiments may be replaced by improved and enhanced items, however the teaching of the present disclosure inherently discloses elements used in embodiments incorporating technology available at the time of this disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed in actuator assembly 19, in accordance with aspects of the present disclosure, as further described below. Actuator assembly 19 thus comprises heads 18 and is configured to position heads 18 over disk surfaces 17 of disks 16. Heads 18 may each comprise write and read elements, configured for writing and reading control features and data to and from a corresponding disk surface 17 of hard disks 16. As will be described in more detail below, heads 18 and disks 16 are also configured for microwave assisted magnetic recording (MAMR).

Actuator assembly 19 comprises a primary actuator 20 (e.g., a voice coil motor ("VCM")) and actuator arms 40 (e.g., topmost actuator arm 40A, as seen in the perspective view of FIGS. 2A and 2B). Each actuator arm 40 comprises a head 18 at a distal end thereof (e.g., example head 18A comprised in topmost actuator arm 40A, in the view of FIGS. 2A and 2B). Each actuator arm 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 32₁ through 32N) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. Servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

In some examples, control circuitry 22 is configured to control actuation of the primary actuator (i.e., VCM 20). Further, VCM 20 is configured to actuate head 18 over disk surfaces 17. In accordance with aspects of this disclosure, control circuitry 22 is further configured to perform a method 80 for applying an extrinsic RF signal (AC current) to a transducer configured in a read-write head of the disk drive, such as head $18_A$. In step 82, control signals for controlling the amplitude and frequency of a control voltage Vcntl are transmitted from a SoC (system-on-a-chip) to a preamp (e.g., through serial I/O lines). In step 84, the control voltage Vcntl is generated and transmitted from the preamp to an RF source IC mounted on or near a slider (e.g., through I/O lines). In step 86, the RF source IC sets the frequency and amplitude of an AC current that is applied to a transducer configured in the slider/head.

As previously noted, read/write heads 18 are configured for microwave assisted magnetic recording (MAMR). MAMR is conventionally implemented by using a spin torque oscillator (STO) to apply a high frequency auxiliary magnetic field to the media close to the resonant frequency of the magnetic grains, thereby enabling the magnetic field generated by the write coil to magnetize the disk surface more readily. The STO has been conventionally integrated directly into the head assembly near the pole-tip, and a DC bias current is applied to the STO to generate the high frequency auxiliary magnetic field that is applied to the media.

Figure 3:
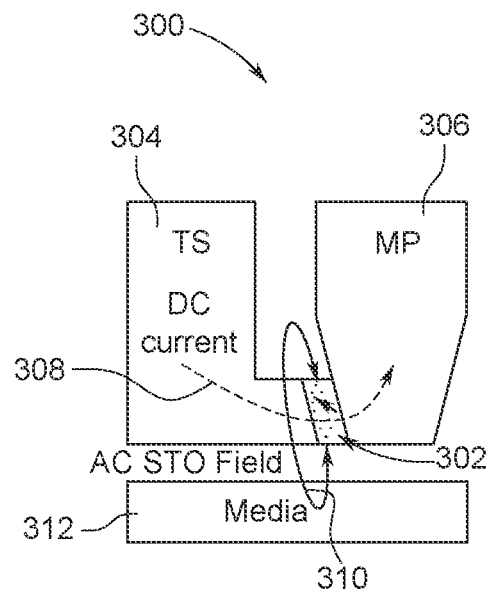
FIG. 3 is a conceptual diagram of a read/write head configured with an STO to facilitate microwave assisted magnetic recording (MAMR), in accordance with various aspects of this disclosure.

FIG. 3 is a conceptual diagram of a head 300 conventionally configured with an STO 302 to facilitate microwave assisted magnetic recording, in accordance with various aspects of this disclosure. STO 302 is configured in the gap between trailing shield (TS) 304 and the pole tip of main pole (MP) 306. A DC bias current 308 is applied to STO 302 to generate a magnetic field 310 that is applied to disk or media 312. A downside of configuring STO 302 in head 300 as shown in FIG. 3 is that it is extremely difficult or impossible to change the frequency and power output of STO 302 without building a whole new head. Even obtaining a measurement of these or other parameters can present a challenge.

Figure 4:
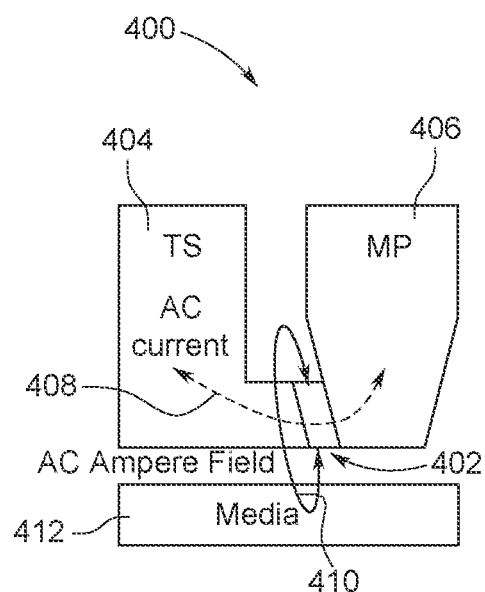
FIG. 4 is a conceptual diagram of a read/write head configured with a transducer to which an extrinsically generated RF signal (AC current) is applied to facilitate microwave assisted magnetic recording (MAMR), in accordance with various aspects of this disclosure.

According to aspects of the present disclosure, an extrinsic RF signal source—rather than an STO—is used to set the frequency and amplitude of an AC current that is applied to a transducer in the head, which in turn generates the high frequency auxiliary field that is applied to the media to provide, for example, the resonance effect in the media grains according to the principles of MAMR. The extrinsic RF signal essentially provides the end effects that are theoretically achievable with the STO but provides for much greater control of the frequency and power output. Such a configuration is illustrated in FIG. 4, which is a conceptual diagram of a head 400 configured with a transducer 402 (e.g., a conductive body such as a metal or conductive wire) to which an extrinsically generated RF signal (AC current) 408 is applied to facilitate microwave assisted magnetic recording, in accordance with various aspects of this disclosure. Transducer 402 is configured in the gap between trailing shield (TS) 404 and the write pole tip of main pole (MP) 406. Extrinsically generated RF signal (AC current) 408 is applied to transducer 402 to generate a magnetic field 410 that is applied to media or disk 412. Write performance is proportionally improved in correlation with the power and frequency of extrinsic RF signal (AC current) 408. It is noted that transducer 402 may be located between the main pole and shields other than the trailing shield in other embodiments. Additional disclosure of related recording head designs and methods of recording is provided in commonly owned U.S. application Ser. No. 17/183,161 titled "Magnetic Recording Devices Having External Alternating Current Sources" filed on Feb. 23, 2021, the disclosure of which is hereby incorporated by reference.

Figure 5:
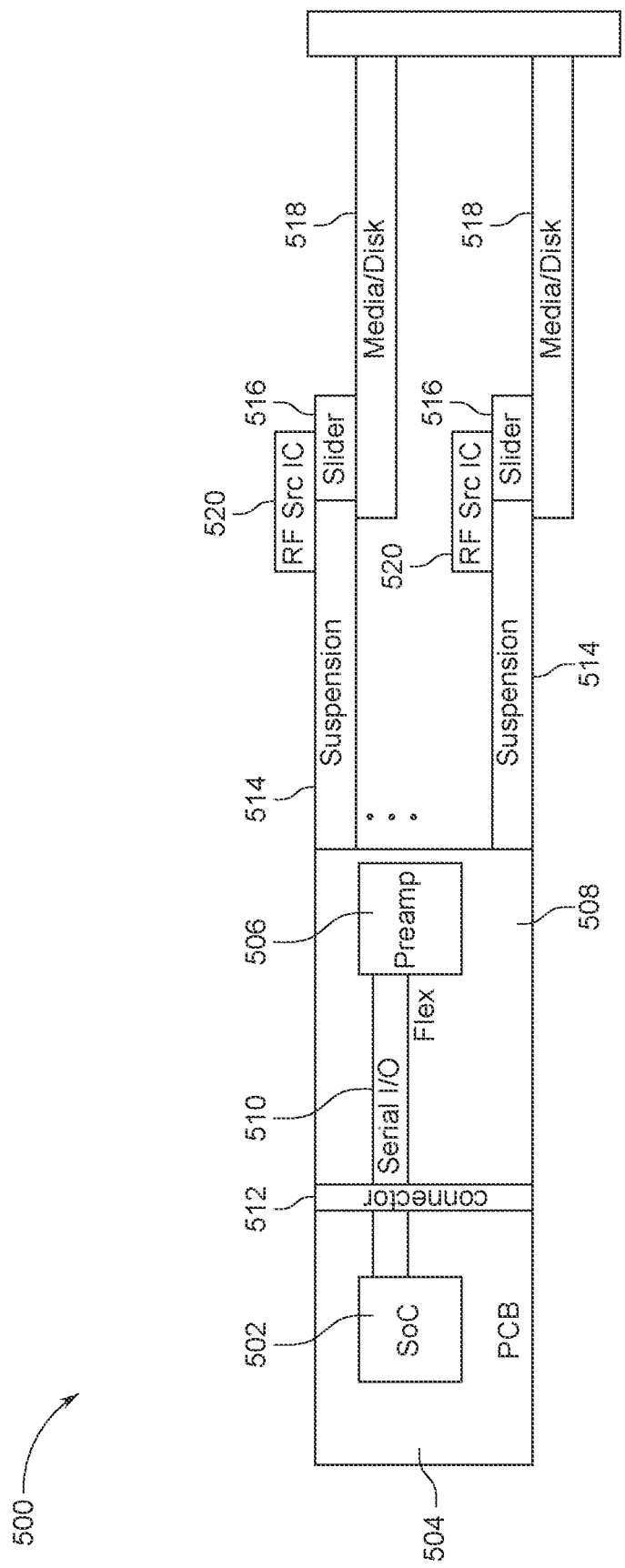
FIG. 5 is a conceptual diagram of a system-controlled RF signal source architecture for generating an extrinsic RF signal to be applied to a read/write head, in accordance with various aspects of this disclosure.

FIG. 5 illustrates a system-controlled RF signal source architecture 500 for generating an extrinsic RF signal (AC current) to be applied to a transducer in a read/write head such as head 400 of FIG. 4, in accordance with various aspects of this disclosure. Architecture 500 includes system-on-a-chip (SoC) 502 configured on printed circuit board (PCB) 504. SoC 502 contains much of the electronics and firmware responsible for controlling disk drive 15, and in particular for controlling the settings of preamplifier (preamp) 506. SoC 502 is shown as connected to preamp 506. Examples of this connection include serial I/O transmission lines 510 on flex cable 508 and while other lines and connections can be used, the disclosure for ease of understanding will use serial I/O lines as the illustrating example. Serial I/O transmission lines 510 may comprise, in one non-limiting example, a serial clock line, a serial data line, and a serial enable line. Preamp 406 includes a write driver, a read amplifier and preamp logic, and is typically located on the actuator that moves the read/write heads to selected data tracks on the disks. Flex connector 512 connects PCB 504 (on which SoC 502 is configured) and flex cable 508, thereby connecting SoC 502 to preamp 506.

SoC 502 controls the settings of preamp 506 via serial I/O transmission lines 510. In a head configured with an STO, such as head 300 of FIG. 3, these controls include the DC bias settings for the transducer. Thus, a subset of these existing control lines relayed from SoC 502 to preamp 506 may instead be used to control the amplitude and frequency of an extrinsic RF signal generated by RF source IC 520. It is advantageous to minimize the number of serial I/O transmission lines 510 that are used, and if possible, to re-use those lines currently being used for the DC-biased STO configuration. In one implementation, based on control signals received from SoC 502, preamp 506 generates two inputs to RF source IC 520—the control voltage Vcntl and ground—which provide for coupled control of the amplitude and frequency of the RF signal. In this configuration, adjusting Vcntl adjusts both the amplitude and frequency of the RF signal. In another implementation, preamp 506 generates a third input Fcntl to RF source IC 520 that provides for independent control of the frequency range of the RF signal.

Figure 6A:
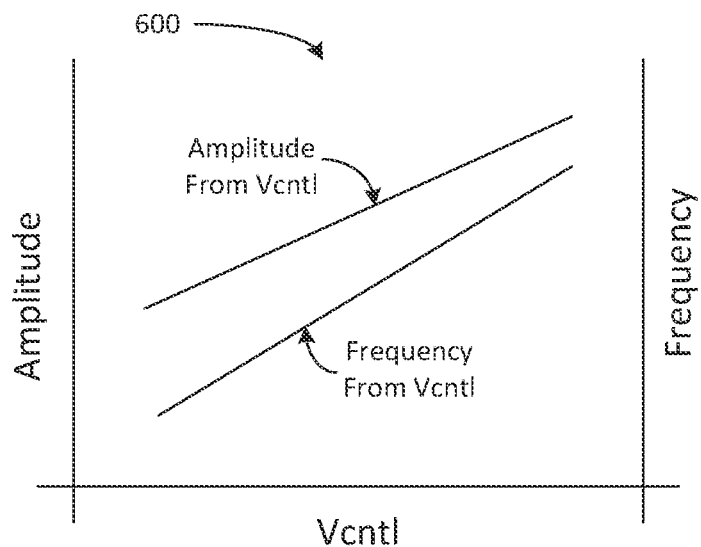
FIG. 6A is a graph showing the control voltage Vcntl vs the frequency and amplitude of an extrinsic RF signal generated by an RF source IC, in accordance with various aspects of this disclosure.
Figure 6B:
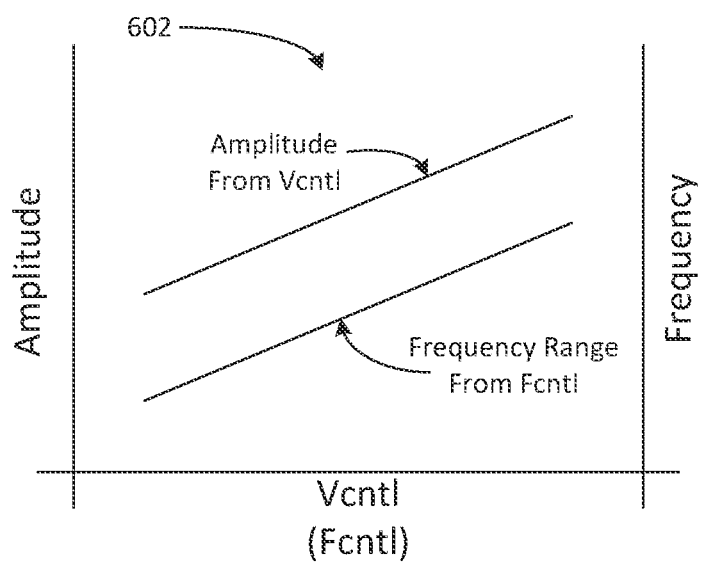
FIG. 6B is a graph showing the control voltage Fcntl vs. the amplitude and frequency range of an extrinsic RF signal generated by an RF source IC, in accordance with various aspects of this disclosure.

FIG. 6A is a graph 600 showing the control voltage Vcntl vs the frequency and amplitude of the extrinsic RF signal where two inputs—Vcntl and ground—are provided from preamp 506 to RF source IC 520, in accordance with various aspects of this disclosure. As can be seen in FIG. 6A, as the control voltage Vcntl is ramped up, frequency and amplitude of the RF signal (AC current) generated by RF source IC 520 also increase. As shown in graph 602 of FIG. 6B, if a third input to RF source IC 520 is provided to provide frequency range control Fcntl, the frequency range Fcntl also increases along with increase of the control voltage Vcntl. The inventors have found that as the frequency and amplitude of an extrinsic RF signal applied to a transducer in the read/write head are increased, write performance is proportionally improved. This improved write performance is advantageously obtained without any temperature dependencies.

The read/write heads of disk drive 15, such as read/write head 400 of FIG. 4 for example, are integrated or configured on sliders 516. Suspensions 514 position sliders 516 in close proximity to the surfaces of disks or media 518. Suspensions 514 also provide the electrical interconnections or I/O lines between the read/write heads configured on sliders 516 and the electronic circuitry of disk drive 15, such as preamp 506. Various examples may include any of a wide variety of other numbers of disks 518, suspensions 514 and sliders 516, besides those illustrated in the example of FIG. 5.

RF source IC 520 is configured on or near each slider 516 to apply the extrinsic RF signal (AC current) to a transducer that is placed near the pole-tip and air-bearing surface of the head integrated in slider 516. With reference to head 400 of FIG. 4, for example, IC 520 applies extrinsic RF signal (AC current) 408 to transducer 402 that is near the pole-tip of main pole 406 and the air-bearing surface of head 400. RF source IC 520 generates the extrinsic RF signal based on the control signals provided from SoC 502 through serial I/O transmission lines 510 to preamp 506, which in turn provides the control signals through I/O lines in flex cable 508 and suspensions 514 to RF source ICs 520. In some embodiments, RF source ICs 520 are configured on or near sliders 516 to avoid the significant interconnect losses that would result (15 to 20 dB) if the extrinsic RF signal were generated by preamp 506, for example, and transmitted through the I/O lines in flex cable 508 and suspensions 514. By placing source ICs 520 on or near sliders 516, the signal losses created by flex cable 508 and suspensions 514 (which would need to be compensated with more signal power) are avoided. In other embodiments, the RF source IC can be placed elsewhere in the drive away from the slider.

Figure 7:
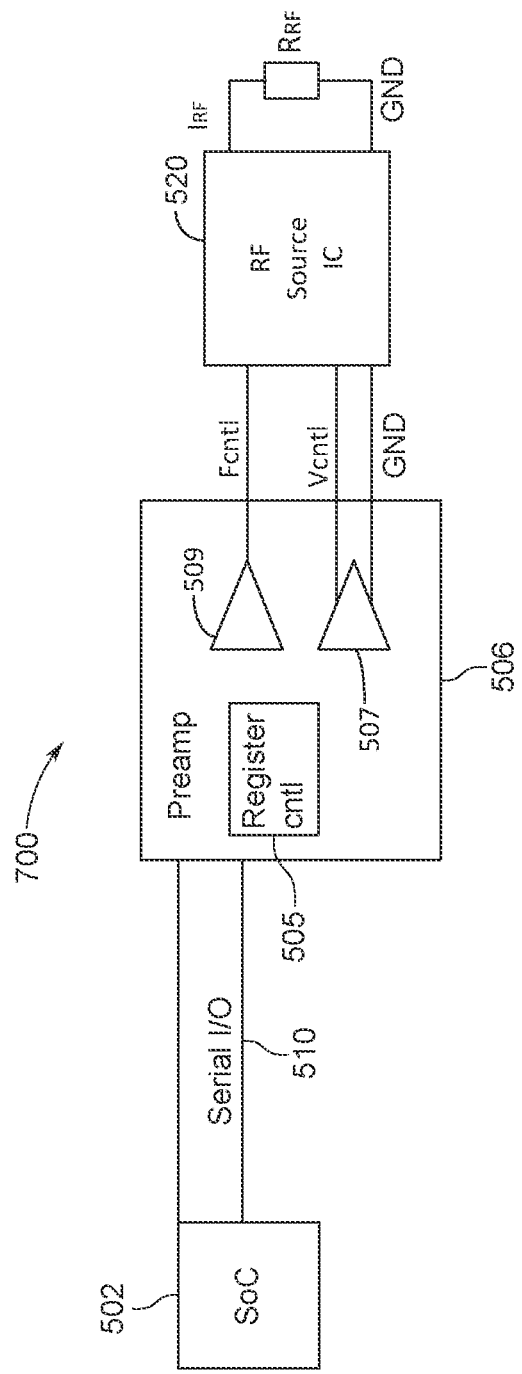
FIG. 7 is a conceptual diagram showing an RF front-end circuit architecture, including an SoC, preamp, and RF source IC, in accordance with various aspects of this disclosure.

FIG. 7 is a conceptual diagram 700 showing the RF front-end circuit architecture, including SoC 502, preamp 506 and RF source IC 520, in accordance with various aspects of this disclosure. As shown, SoC 502 utilizes serial I/O transmission lines 510 to provide control signals to preamp 506, which in turn generates control voltage (Vcntl)

and ground (GND) signals that are transmitted to RF source IC 520. In addition, based on control signals received from SoC 502, preamp 506 may optionally generate a frequency range control signal Fcntl that is transmitted to RF source IC 520. In particular, the control voltage Vcntl may be transmitted from preamp 506 to RF source IC 520 over a first I/O line, the ground signal may be transmitted from preamp 506 to RF source IC 520 over a second I/O line, and the frequency range control signal Fcntl may be transmitted to RF source IC 520 over a third I/O line.

As can be seen in FIG. 7, preamp 506 may comprise a register 505 for storing data received from SoC 502 that is used to control the control voltage signal Vcntl and (optionally) the frequency range control signal Fcntl. Preamp 506 may further comprise a voltage-controlled oscillator 507 for generating the output control voltage Vcntl, and a voltage-controlled oscillator 509 for generating the frequency range control signal Fcntl. In one implementation, voltage-controlled oscillators 507 and 509 are low-dropout (LDO) regulators to provide greater stability of the output signals Vcntl and Fcntl.

Figure 8:
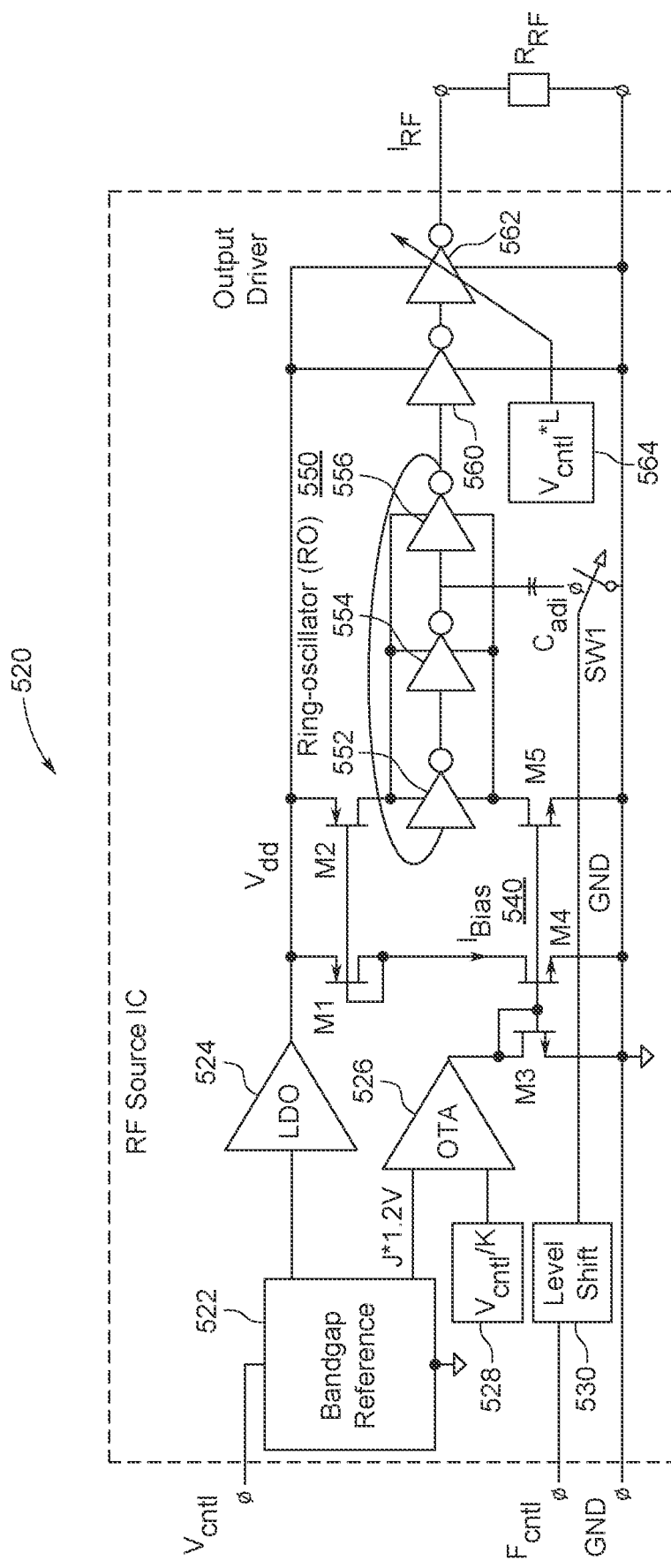
FIG. 8 is a circuit diagram of an RF source IC, in accordance with various aspects of this disclosure.

FIG. 8 is a circuit diagram of RF source IC 520, in accordance with various aspects of this disclosure. In a two I/O line configuration, RF source IC 520 receives control voltage (Vcntl) and ground (GND) inputs. If a third I/O line is added, RF source IC 520 may also receive a frequency range Fcntl input. The GND input may optionally be shared with other transducers. The control voltage Vcntl is supplied to bandgap reference circuit 522, which produces an internal, temperature independent, bandgap reference voltage. In one implementation, bandgap reference circuit 522 produces a bandgap reference voltage of 1.2 volts.

The reference voltage produced by bandgap reference circuit 522 is supplied to low-dropout (LDO) regulator 524, which generates an output voltage Vdd. In one implementation, the voltage Vdd output by LDO regulator 524 is 0.8V.

Operational transconductance amplifier (OTA) 526 is an amplifier to which differential input voltages are applied to produce an output current. The current output by OTA 526 drives the strength and changes the frequency range of ring oscillator 550. The voltages input to OTA 526 are the bandgap reference voltage (in one implementation, 1.2V), which may be multiplied by a factor J, and the control voltage Vcntl, which may be divided by a factor K. Thus, one of the differential voltage inputs to OTA 526 stays fixed (the bandgap reference voltage), while the other differential voltage input to OTA 526 (the control voltage Vcntl) increases as the supply voltage Vcc to the preamp increases.

The current output by OTA 526 flows through current mirror 540, which in some implementations comprises PMOS devices M1 and M2 and NMOS devices M3, M4 and M5. As the current output by OTA 526 changes, the current $I_{Bias}$ flowing through current mirror 540 changes. Current mirror 540 supplies the conductance between Vdd and ground and as it changes, the current $I_{Bias}$ supplied to ring oscillator 550 and the frequency $F_{RO}$ of ring oscillator 550 also change.

Ring oscillator 550 is a device consisting in some implementations of an odd number of NOT gates (inverters) in which the output voltage oscillates between levels. In the non-limiting example of FIG. 8, ring oscillator 550 comprises three inverters 552, 554 and 556. Each inverter delays the input signal for a certain period of time (the gate delay time $t_{INV}$). Thus, the delay time of the ring oscillator is equal to the product of a single gate delay time multiplied by the number of states ($3*t_{INV}$). If an optional third I/O line 510 is added to provide a frequency range input $F_{cntl}$, as is shown in FIG. 8, the ability to level shift the frequency range of ring oscillator 550 is provided. In particular, frequency control $F_{cntl}$ is input to level shift 530, which via digital switch SW1 is able to switch in (or out) capacitance (represented by $C_{adj}$) to ring oscillator 550. In this case, an additional delay time of $3*C_{adj}*I_{Bias}$ is added to the delay time of the oscillator, resulting in a total delay time $t_{RO}$ as follows:

$$t_{RO}=(3*t_{INV})+(3*C_{adj}*I_{Bias})$$

The resulting frequency $F_{RO}$ of ring oscillator 550 may be represented as follows:

$$F_{RO}=(2*t_{RO})^{-1}$$

Thus, ring oscillator 550 outputs a current having a frequency $F_{RO}$. As can be seen in FIG. 8, the output current of ring oscillator 550 passes through two additional inverters 560 and 562, with the final inverter 562 being an output driver having a control 564, consisting of Vcntl multiplied by a factor L, that is used to adjust the amplitude of the output current $I_{RF}$ of RF source IC 520. As previously described, RF source IC 520 can be mounted on or near slider 516 (FIG. 5), on which head 400 is configured (FIG. 4). The output current $I_{RF}$ is driven to transducer 402 of head 400, which is represented by the load $R_{RF}$ in FIG. 8.

Figure 9:
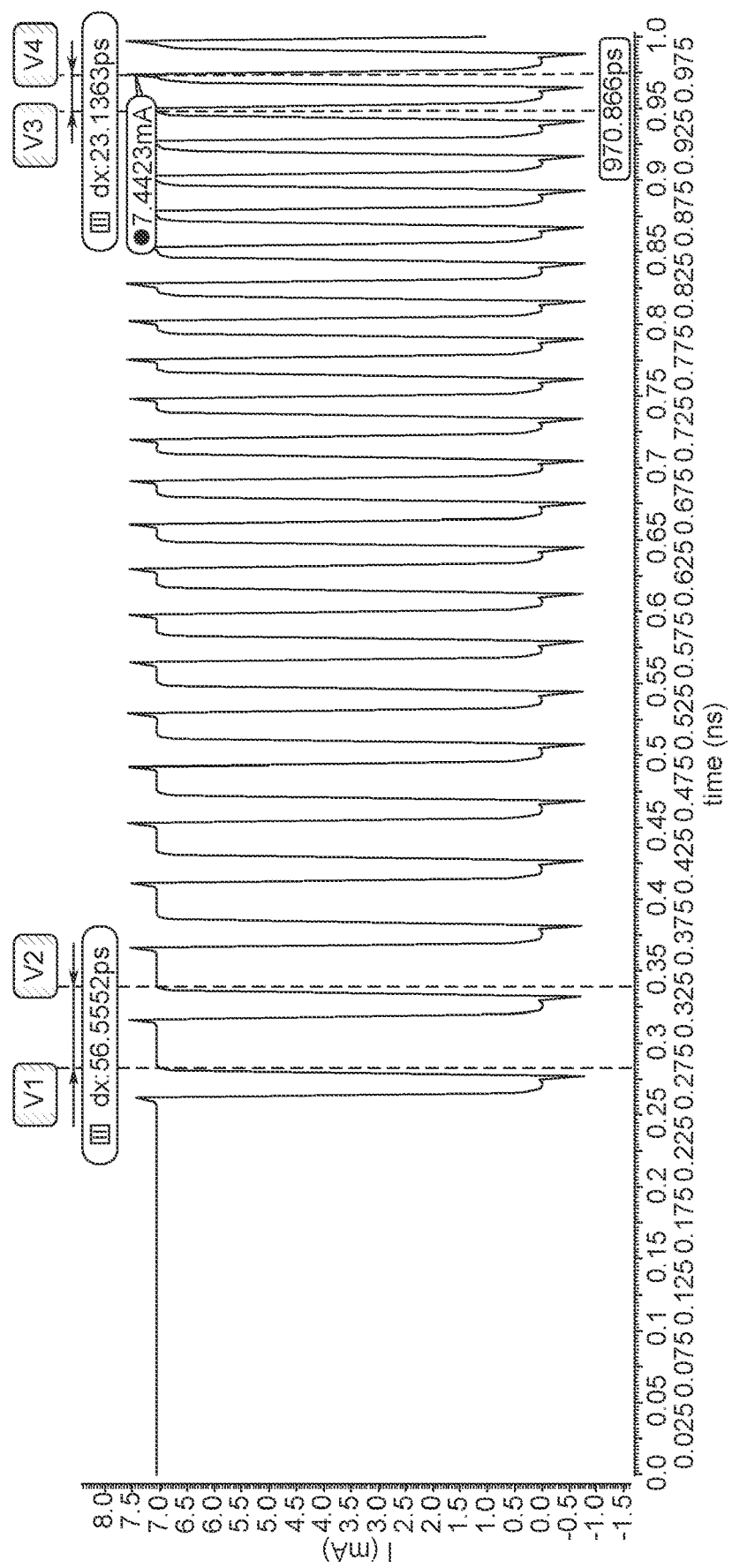
FIG. 9 is a graph showing an exemplary frequency and amplitude of output current $I_{RF}$, in accordance with various aspects of this disclosure.

FIG. 9 is a graph 900 showing an exemplary frequency and amplitude of output current $I_{RF}$, in accordance with various aspects of this disclosure. As can be seen in FIG. 9, as the OTA current ramps up (as driven by Vcntl), the frequency of the output current $I_{RF}$ increases from 17 GHz to 43 GHZ, with a peak-to-peak amplitude of 7 mA. As was described with reference to FIGS. 5-8, both the frequency and amplitude of $I_{RF}$ can be controlled by the control voltage Vcntl and ground signal GND supplied to RF source IC 520 over two I/O lines from preamp 506, which in turn are controlled by signals provided by SoC 502 to preamp 506 over the serial I/O lines. In addition, a third I/O line may optionally be employed to provide a frequency range control signal Fcntl that provides the ability to level shift the frequency of the ring oscillator in RF source IC 520.

Figure 10:
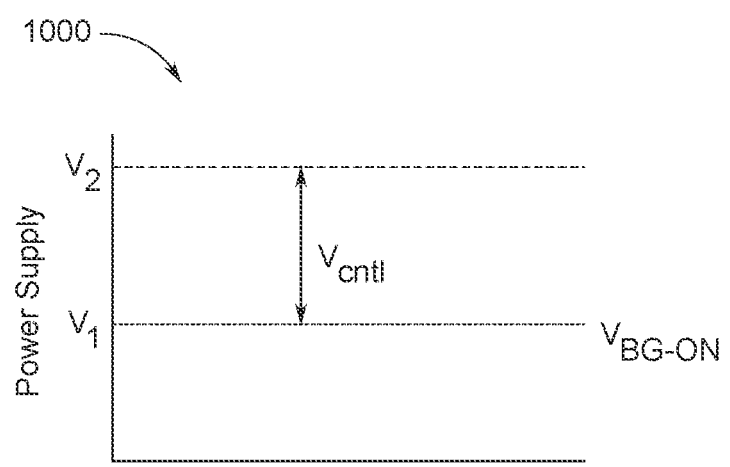
FIG. 10 is a graph illustrating a two-level activation architecture, in accordance with various aspects of this disclosure.

As described with reference to FIG. 8, RF source IC 520 includes a bandgap reference circuit 522 that sets a bandgap reference voltage, that is in turn used for operation of OTA 526. In one implementation, the bandgap reference voltage is 1.2V. Bandgap reference circuit 522 is controlled by the control voltage Vcntl. Thus, bandgap reference circuit 522 and in turn RF source IC 520 could have a long turn on time that is dependent on the ramping up time of the control voltage Vcntl. FIG. 10 is a graph 1000 illustrating a two-level activation architecture addressing this issue, in accordance with various aspects of this disclosure. As a starting point, the control voltage is set to be the voltage $V_{BG\text{-}ON}$ required for bandgap reference circuit 522 to be on, which is indicated in FIG. 10 as a first level $V_1$. Thus, the bandgap turns on at $V_1$, which is the first level of the architecture. Control of frequency and amplitude may then occur between $V_1$ and another higher voltage $V_2$, as shown in FIG. 10, which is the second level of the architecture.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. As described above, control circuitry 22 may be wholly or partly implemented in various portions of an RF signal source architecture including, without limitation SoC 502, preamp 506, flex cable 508, suspensions 514 and RF source IC 520.

In some examples, the control circuitry, such as, but not limited to, control circuitry 22, comprises a microprocessor executing instructions, the instructions being operable to cause the microprocessor to perform the flow diagrams (e.g., shown in FIG. 2C) described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and other aspects of this disclosure. Persons skilled in the relevant fields of art will be well-equipped by this disclosure and by the claims set forth below with an understanding and an informed reduction to practice of a wide panoply of further applications, architectures, techniques, and methods.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a disk;
a read/write head configured to read data from and write data to the disk, the read/write head comprising a write pole tip and a transducer configured near the write pole tip;
a slider on which the read/write head is integrated or mounted; and
one or more processing devices comprising an RF source IC mounted on or near the slider, wherein the RF source IC is configured to:
set an amplitude and a frequency of an AC current in response to a control voltage and a ground signal received from a preamplifier, and
generate the AC current that is applied to the transducer to cause the transducer to generate a high frequency auxiliary field that is applied to the disk.

2. The data storage device of claim 1, wherein:
the preamplifier is connected to the RF source IC through a first I/O line and a second I/O line, and wherein
the preamplifier is configured to transmit the control voltage over the first I/O line and the ground signal over the second I/O line to the RF source IC.

3. The data storage device of claim 2, wherein the preamplifier is connected to the RF source IC through a third I/O line, and the preamplifier is configured to transmit a frequency range control signal to the RF source IC over the third I/O line.

4. The data storage device of claim 2, further comprising a system-on-a-chip (SoC) that is coupled to the preamplifier, and wherein the SoC is configured to transmit a control signal to the preamplifier that causes the preamplifier to generate and output the control voltage to the RF source IC.

5. The data storage device of claim 2, wherein the RF source IC comprises a ring oscillator that is configured to control the frequency of the AC current that is applied to the transducer.

6. The data storage device of claim 5, wherein the RF source IC further comprises an operational transconductance amplifier (OTA) that is configured to drive a strength and to change a frequency range of the ring oscillator.

7. The data storage device of claim 6, wherein the OTA is configured to be driven by a bandgap reference voltage and the control voltage.

8. The data storage device of claim 7, wherein the RF source IC further comprises a bandgap reference circuit, and wherein the bandgap reference circuit is configured to be driven by the control voltage and is configured to generate and supply the bandgap reference voltage to the OTA.

9. The data storage device of claim 8, wherein the bandgap reference voltage generated by the bandgap reference circuit is approximately 1.2 volts.

10. The data storage device of claim 6, wherein the RF source IC further comprises a low drop-out regulator configured to generate a reference voltage.

11. A method of operating a data storage device, comprising:
transmitting a control signal for setting a control voltage from a system-on-a-chip (SoC) to a preamplifier;
in response to the control signal, generating and transmitting the control voltage from the preamplifier to an RF source IC mounted on or near a slider; and
in response to the control voltage and a ground signal transmitted from the preamplifier, setting a frequency and an amplitude of an AC current by the RF source IC and applying the AC current to a transducer that is configured in the slider near a write pole tip of a read/write head, such that the transducer generates a high frequency auxiliary field that is applied to a disk of the data storage device, wherein the read/write head is integrated or mounted on the slider.

12. The method of claim 11, further comprising:
transmitting the control voltage from the preamplifier to the RF source IC through a first I/O line; and
transmitting the ground signal from the preamplifier to the RF source IC through a second I/O line.

13. The method of claim 12, further comprising:
transmitting a frequency range control signal from the preamplifier to the RF source IC through a third I/O line.

14. The method of claim 11, further comprising transmitting the control signal from the SoC to the preamplifier through a serial I/O line.

15. The method of claim 11, further comprising setting the frequency of the AC current by a ring oscillator in the RF source IC.

16. The method of claim 15, further comprising driving a strength and changing the frequency of the ring oscillator by an operational transconductance amplifier (OTA).

17. The method of claim 16, further comprising driving the OTA by a bandgap reference voltage and the control voltage.

18. One or more processing devices comprising:
means for transmitting a control signal from a system-on-a-chip (SoC) to a preamplifier;
means for, in response to the control signal, generating and transmitting a control voltage from the preamplifier to an RF source IC mounted on or near a slider; and
means for, in response to the control voltage, setting a frequency and an amplitude of an AC current by the RF source IC and applying the AC current to a transducer that is configured in the slider near a write pole tip of a read/write head, such that the transducer generates a high frequency auxiliary field that is applied to a disk of a data storage device.

19. The one or more processing devices of claim 18, further comprising:
means for transmitting the control voltage from the preamplifier to the RF source IC through a first I/O line; and
means for transmitting a ground signal from the preamplifier to the RF source IC through a second I/O line.

* * * * *